(12) United States Patent
Nekado

(10) Patent No.: US 6,549,003 B2
(45) Date of Patent: *Apr. 15, 2003

(54) POSITION DETECTOR UTILIZING TWO MAGNETIC FIELD SENSORS AND A SCALE

(75) Inventor: Yasuo Nekado, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/818,050

(22) Filed: Mar. 27, 2001

(65) Prior Publication Data

US 2001/0035749 A1 Nov. 1, 2001

(30) Foreign Application Priority Data

Mar. 29, 2000 (JP) ........................................ 2000-095293

(51) Int. Cl.[7] .............................. G01B 7/14; G01B 7/30
(52) U.S. Cl. .................................................. 324/207.15
(58) Field of Search ...................... 324/207.15, 207.24, 324/207.2, 207.21, 207.19, 207.16; 338/32 R, 32 M

(56) References Cited

U.S. PATENT DOCUMENTS 5,565,769 A * 10/1996 Mehnet et al. ......... 324/207.15
6,373,239 B1 * 4/2002 Nekado .................. 324/207.15

* cited by examiner

Primary Examiner—Edward Lefkowitz
Assistant Examiner—Subhash Zaveri
(74) Attorney, Agent, or Firm—Jay H. Maioli

(57) ABSTRACT

A position transducer including a scale and magnetic sensor system consisting of a first sensor unit and second sensor unit disposed in different positions in a direction (Z-direction) perpendicular to a moving direction (X-direction) of the magnetic sensor relative to the scale. The first and second sensor units are driven in phase with each other with a high frequency signal, and a difference between outputs of these two sensor units is determined in order to detect a relative position of the magnetic sensor to the scale.

2 Claims, 10 Drawing Sheets

POSITION DETECTOR UTILIZING TWO MAGNETIC FIELD SENSORS AND A SCALE

BACKGROUND OF THE INVENTION

1. Field of the Invention

The present invention relates to a position transducer which detects an amount of travel and moved position of a moving part which is a linearly moving part of a machine tool, industrial robot or the like.

2. Description of the Related Art

Various types of position transducer has been proposed to detect an amount of travel and moved position of a moving part which is a linearly moving part of the machine tool, industrial robot or the like. An example of such position transducers is known from the disclosure in the Japanese Published Unexamined Application No. 10-531835 for example. The position transducer disclosed in this publication includes a scale which develops a magnetic field whose strength and direction change linearly correspondingly to a position of such a moving part, and a magnetic sensor which moves in relation to the scale and detects a magnetic field from the scale at a position to which has moved.

The position transducer proposed in the Japanese Published Unexamined Application No. 10-531835 is constructed as schematically illustrated in FIG. 1.

The position transducer is generally indicated with a reference 100. The position transducer 100 includes a scale 101 and a magnetic sensor 102. The scale 101 consists of a pair of members 101a and 101b formed from a ferrite plastic magnet plate or the like and each having an end face which is oblique at a predetermined angle θ in relation to a direction of movement thereof relative to the magnetic sensor 102. The members 101a and 101b in pair are joined integrally to each other with their respective oblique end faces placed to abut each other. The pair of members 101a and 101b is magnetized to be opposite in polarity to each other in a direction perpendicular to main sides thereof.

The magnetic sensor 102 includes a magnetic core 103 formed from a square ring of a high permeability material such as NI—Fe alloy or amorphous alloy and which forms a closed magnetic circuit, and a pair of detection coils 104 and 105 wound on two longitudinal core pieces, opposite to each other, of the magnetic core 103, respectively. The detection coils 104 and 105 in pair are driven in opposite phases to each other with a high frequency pulsed current to develop magnetic fields in opposite directions.

When the magnetic sensor 102 is at a predetermined distance from the scale 101, the two longitudinal core pieces of the core 103, on which the detection coils 104 and 105 in pair are wound, respectively, are perpendicular to the main sides of the scale 101, a line connecting these two core pieces is perpendicular to a longitudinal center line n of the scale 101 and the mid point between the two core pieces is right above the longitudinal center line n of the scale 101.

In the above geometric relation, the scale 101 and magnetic sensor 102 are installed to a stationary part and a moving part, respectively, of a machine tool, industrial robot or the like, and moved relatively to each other along the longitudinal center line n of the scale 101 as the moving part moves linearly. At each position the magnetic sensor 102 will take along the length of the scale 101, the magnetic sensor 102 will detect a magnetic field developed by the scale 101 and perpendicular to the main sides of the scale 101.

On the assumption that the longitudinal direction of the scale 101, that is, the direction in which the magnetic sensor 102 is moved in relation to the scale 101, is taken as X-direction while a lateral (short-side) direction of the scale 101, perpendicular to the X-direction is taken as Y-direction, and a direction perpendicular to the main sides of the scale 101 is taken as Z-direction, the principle of detection of the position transducer 100 will be described below with reference to FIGS. 2 and 3.

FIG. 2 is a Y-directional sectional view of the scale 101 located at a position where the longitudinal center line n of the scale 101 intersects with a boundary line of the pair of members 101a and 101b forming together the scale 101. As seen from FIG. 3, in the Y-directional section of the scale 101, a magnetic flux Φz produced in the Z-direction changes linearly in a range of ±W/4 (where W is a Y-directional length of the scale 101) from a Y-directional center of the scale 101, that is to say, the boundary line of the pair of members 101a and 101b forming together the scale 101. Therefore, with a position transducer construction in which when the magnetic sensor 102 is moved in X-directionally in relation to the scale 101, it will have moved substantially in the Y-direction of the scale 101 within a range of ±W/4 from the boundary line of the pair of members 101a and 101b forming together the scale 101, it is possible to detect an X-directionally moved position of the magnetic sensor 102 relative to the scale 101 from the strength of the magnetic flux Φz produced in the Z-direction.

In the position transducer 100, the X-directional length L1 of the scale 101 is larger than the effective length for detection L2, and an angle θ formed between the moving direction of the magnetic sensor 102 relative to the scale 101 and boundary line of the pair of members 101a and 101b forming together the scale 101 is θ=tan −1(d/L2)(where d is W/2 or less), so that the magnetic sensor 102 will be moved relatively moved in the X-direction along the longitudinal center line n of the scale 101. Therefore, the Z-directional magnetic flux Φz at each position the magnetic sensor 102 will take when the latter is moved relatively to the scale 101 will change linearly as in the Y-directional movement of the magnetic sensor 102.

In the position transducer 100, a Z-directional magnetic flux Φz at each position the magnetic sensor 102 will take when the latter is moved relatively to the scale 101 is detected by the pair of detection coils 104 and 105 driven in opposite phases to each other with a high frequency pulsed current to develop magnetic fields in opposite directions, impedances of these detection coils 104 and 105, which will change correspondingly to an external magnetic field, are converted to voltages, respectively, and a difference between the voltages is determined, to thereby detect a moved position of the magnetic sensor 102 relative to the scale 101.

With the position transducer 100, since a moved position of the magnetic sensor 102 relative to the scale 101 is detected by determining a difference between outputs of the pair of detection coils 104 and 105 driven in opposite phases to each other, it is possible to provide a large output while canceling the influence of electric noises and detect, with an extremely high accuracy, a moved position of the magnetic sensor 102 relative to the scale 101, namely, an amount of travel and moved position of the moving part relative to the stationary part of the machine tool, industrial robot or the like.

The position transducer disclosed in the aforementioned Japanese Published Unexamined Application No. 10-531835 is an excellent one capable of detecting, with an extremely high accuracy of an amount of travel and moved position of a moving part relative to a stationary part of a machine tool, industrial robot or the like. However, the results of experiments conducted on this position transducer proved that if the position transducer is used in an environment where a disturbing magnetic field such as geomagnetism acts strongly, such a disturbing magnetic field and a magnetic field indicative of positional data, developed by the scale 101, cannot be differentiated between them and a change of DC output due to a disturbing magnetic field is superposed on the output from the magnetic sensor 102 and thus no accurate positional data can be provided by the position transducer.

OBJECT AND SUMMARY OF THE INVENTION

It is therefore an object of the present invention to overcome the above-mentioned drawbacks of the prior art by providing a position transducer which can be used for position detection in even an environment where a disturbing magnetic field such as geomagnetism acts relatively strongly to provide accurate positional data while suppressing the influence of such a disturbing magnetic field.

The above object can be attained by providing a position transducer including means for developing a magnetic field whose strength and direction change correspondingly to a position of the means, means moved relatively to the magnetic field developing means fro detecting a magnetic field developed by the magnetic field developing means and providing an electrical signal corresponding to the detected magnetic field, and means for detecting a position of the magnetic field detecting means relative to the magnetic field developing means on the basis of the electrical signal provided from the magnetic field developing means; the magnetic field detecting means consisting of two sensor units each formed from a sensor coil wound on a high permeability core and driven in phase with each other with a high frequency, the two sensor units being disposed in different positions in a direction perpendicular to a moving direction of the magnetic field detecting means relative to the magnetic field developing means; and the position detecting means detecting a relative position of the magnetic field developing means to the magnetic field developing means by determining a difference between outputs of the two sensor units.

In the above position transducer, when the magnetic field detecting means consisting of the two sensor units is moved relatively to the magnetic field developing means which develops a magnetic field whose strength and direction change correspondingly to a position of the means, the impedances of the sensor coils of the two sensor units will change corresponding to an amount of travel of the magnetic field detecting means. Since the two sensor units are disposed in the different positions in the direction perpendicular to the moving direction of the magnetic field detecting means relative to the magnetic field developing means, so a magnetic field developed by the magnetic field developing means will have differences in magnetic field from the two sensor units, respectively. Thus, the amount of a change in impedance of the sensor coils, caused by the movement of the magnetic field detecting means relative to the magnetic field developing means, will also be different between the two sensor units. In this position transducer, the two sensor units of the magnetic field detecting means provide electrical signals, respectively, corresponding to the impedances of the sensor coils, respectively, and the position detecting means determines a difference between outputs of the two sensor units, to thereby determine a relative position of the magnetic field detecting means to the magnetic field developing means. Therefore, with either the magnetic field developing means or magnetic field detecting means of the position transducer fixed to a moving part of a machine tool, industrial robot or the like, it is possible to detect an amount of travel and moved position of the moving part.

Also, with this position transducer, since a difference between outputs of the two sensor units disposed in different positions in the direction perpendicular to the moving direction of the magnetic field detecting means relative to the magnetic field developing means and driven in phase with each other with a high frequency, to thereby detecting a relative position of the magnetic field detecting means to the magnetic field developing means, so it is possible to appropriately detect the position while canceling the influence of a disturbing magnetic field such as geomagnetism incident in phase and uniformly upon the sensor units.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
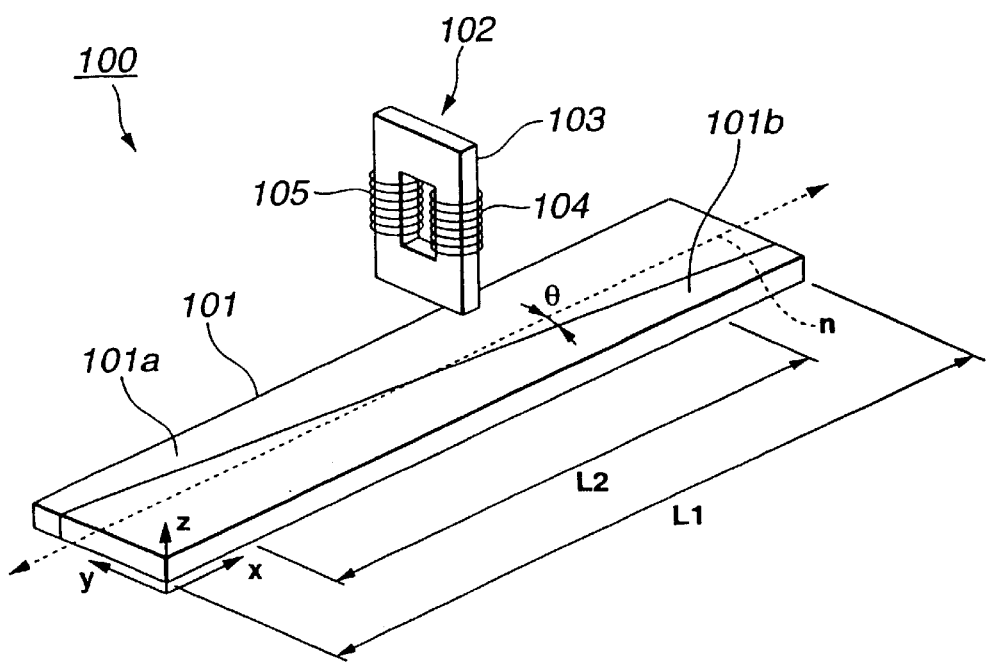
FIG. 1 is a perspective view of a conventional position transducer, schematically showing the construction thereof.
Figure 2:
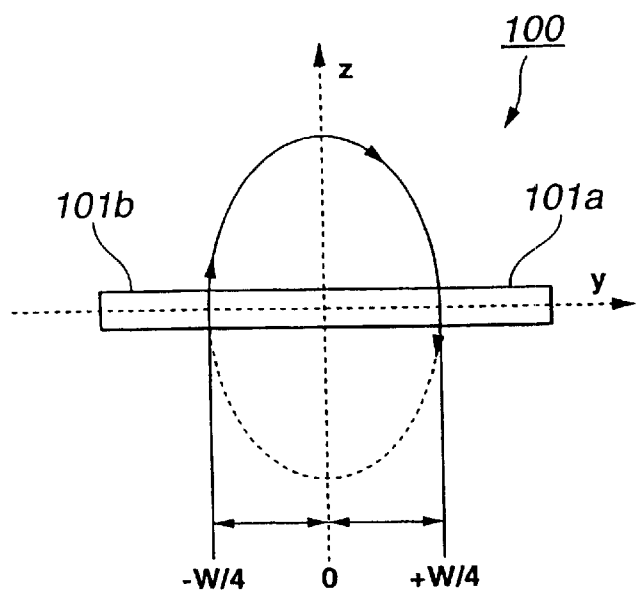
FIG. 2 shows the magnetic field developed by the scale provided in the conventional position transducer.
Figure 3:
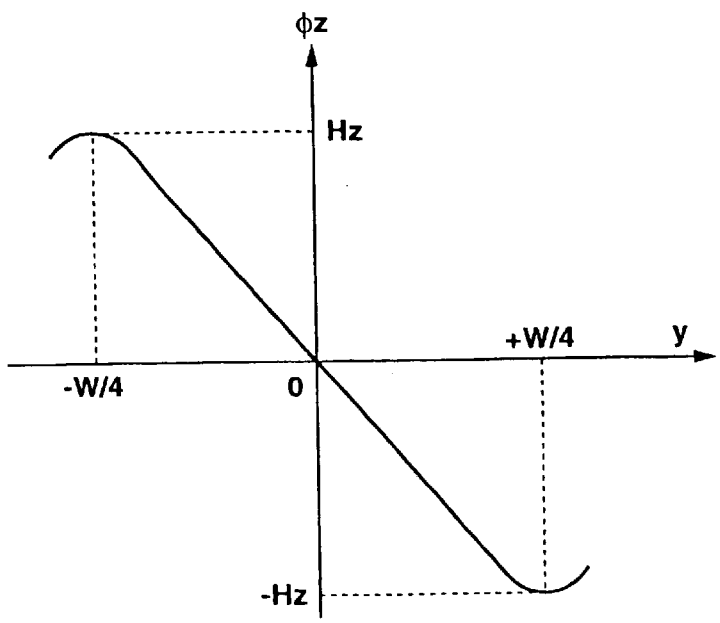
FIG. 3 explains the strength of a magnetic field developed in the Z-direction of the scale provided in the conventional position transducer.
Figure 4:
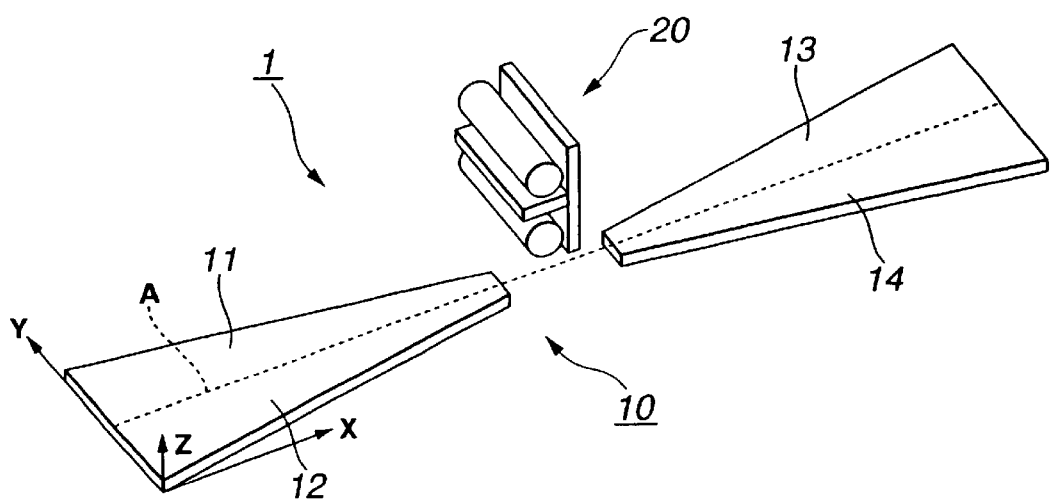
FIG. 4 is a perspective view of an embodiment of the position transducer according to the present invention, schematically illustrating the construction thereof.

Referring now to FIG. 4, there is schematically illustrated in the form of a perspective view the construction of an embodiment of the position transducer according to the present invention. The position transducer is generally indicated with a reference 1. As shown, the position transducer 1 includes a scale 10 which develops a magnetic field whose strength and direction change linearly depending upon a position of the scale 10 and a magnetic sensor 20 which detects a magnetic field developed by the scale 10. Either the scale 10 or the magnetic sensor 20 is fixed to a moving part being a linearly moving part of a machine tool, industrial robot or the like while the other is fixed to a stationary part of the machine tool, industrial robot or the like. As the moving part of the machine tool, industrial robot or the like moves linearly, the magnetic sensor 20 is moved in relation to the scale 10 along the center line A of the scale 10, detects a magnetic field developed by the scale 10 at each moved position thereof, and provides an electrical signal corresponding to the detected magnetic field.

In the position transducer 1, an electrical signal indicating positional data provided from the magnetic sensor 20 is supplied to a drive/detection circuit (not shown in FIG. 4). Then, the drive/detection circuit detects an amount of travel and moved position of the magnetic sensor 20 relative to the scale 10 on the basis of the electrical signal supplied from the magnetic sensor 20, to thereby detecting an amount of travel and moving distance of the moving part of the machine tool, industrial robot or the like. Note that the present invention will be described in further detail herebelow concerning the position transducer 1 in which the effective length for detection is set to 40 mm so that it can appropriately detect an amount of travel and moved position of a moving part moving linearly in a range of 40 mm at the maximum.

The scale 10 consists of first to fourth magnetic field developing members 11, 12, 13 and 14 each formed from a trapezoidal plate of a ferrite plastic magnet for example. These first to fourth magnetic field developing members 11, 12, 13 and 14 are identical in shape to each other, and magnetized in a direction perpendicular to main sides thereof. Note that the material of the first to fourth magnetic field developing members 11, 12, 13 and 14 is not limited to the above-mentioned ferrite plastic magnet but may be a selected one of SmCo magnet, NdFeB magnet, sintered magnet, FeMn and AlNiCo alloy magnets, etc.

Figure 5:
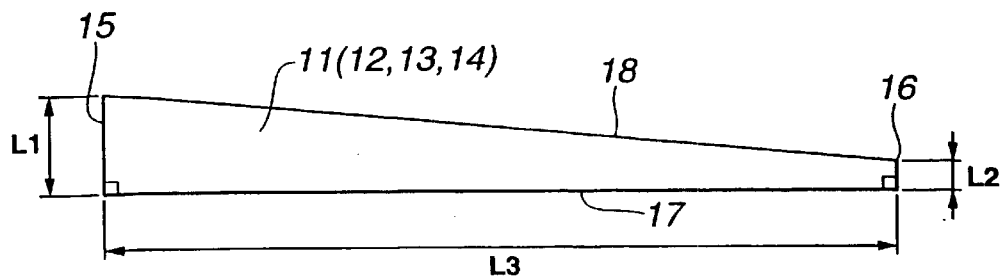
FIG. 5 is a plan view of the magnetic field developing members of the scale.

As shown in FIG. 5, each of the above magnetic field developing members 11, 12, 13 and 14 has first and second sides 15 and 16 parallel to each other, a third side perpendicular to the first and second sides 15 and 16, and a fourth side 18 forming an acute angle with the first side 15. The first side 15 has a length L1 of about 1.8 mm for example, the second side 16 has a length L2 of about 0.35 mm, and the third side 17 has a length L3 of about 23 mm.

Figure 6:
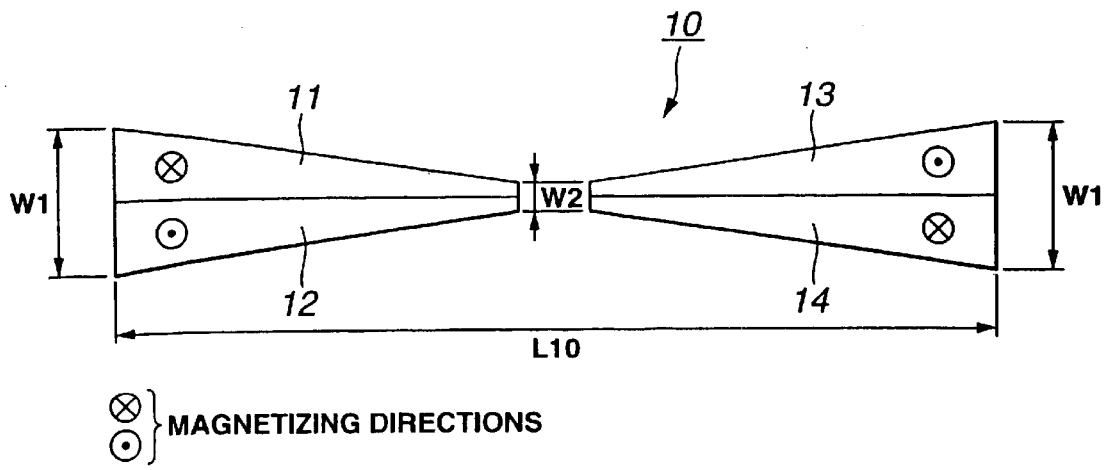
FIG. 6 is a plan view of the scale formed from a combination of the magnetic field developing members.

As shown in FIG. 6, the magnetic field developing members 11, 12, 13 and 14 are assembled together to form the scale 10. More specifically, the first and second magnetic field developing members 11 and 12 are disposed to abut each other at the third sides 17 thereof so that their magnetizing directions are opposite to each other, while the third and fourth magnetic field developing members 13 and 14 are disposed to abut each other at the third sides 17 thereof so that their magnetizing directions are opposite to each other. The first and third magnetic field developing members 11 and 13 are disposed to define a predetermined air gap between the second sides 16 thereof so that their magnetizing directions are opposite to each other while the second and fourth magnetic field developing members 12 and 14 are disposed to define a predetermined air gap between the second sides 16 thereof so that their magnetizing directions are opposite to each other.

The scale 10 thus formed from the assembly of the first to fourth magnetic field developing members 11, 12, 13 and 14 as in the above has a total length L10 of about 52 mm for example in the longitudinal direction thereof, a width W1 of about 3.6 mm for example at either longitudinal outer end thereof and a width W2 of about 0.7 mm for example at inner ends thereof opposite to each other with the predetermined air gaps between the sides 16.

The scale 10 thus constructed develops a magnetic field whose strength and direction change linearly at each longitudinal position along a center line A in FIG. 4. More particularly, of the magnetic field developed by the scale 10, a component detected on the center line A and parallel to the main sides of each of the magnetic field developing members 11, 12, 13 and 14 shows a strength which is gradually smaller as it goes from the longitudinal outer ends of the scale 10 towards a central portion of the scale 10 where the air gaps are defined as in the above. The magnetizing direction is inverted at the longitudinal center of the scale 10. Therefore, a magnetic field component existing on the center line A of the scale 10 and parallel to the main sides of the magnetic field developing members 11, 12, 13 and 14 will indicate positional data in the longitudinal direction of the scale 10, and thus a longitudinal position of the scale 10 can be detected by detecting the magnetic field component. Especially, with the scale 10, it is possible to obtain a magnetic field change having a high linearity in a range of about 40 mm except for a part at each longitudinal outer end of the scale 10, and a moved position of the magnetic sensor 20 relative to the scale 10 can be detected with a high accuracy by moving the magnetic sensor 20 relatively to the scale 10 within the above range (this range is taken as an effective length for detection).

Figure 7:
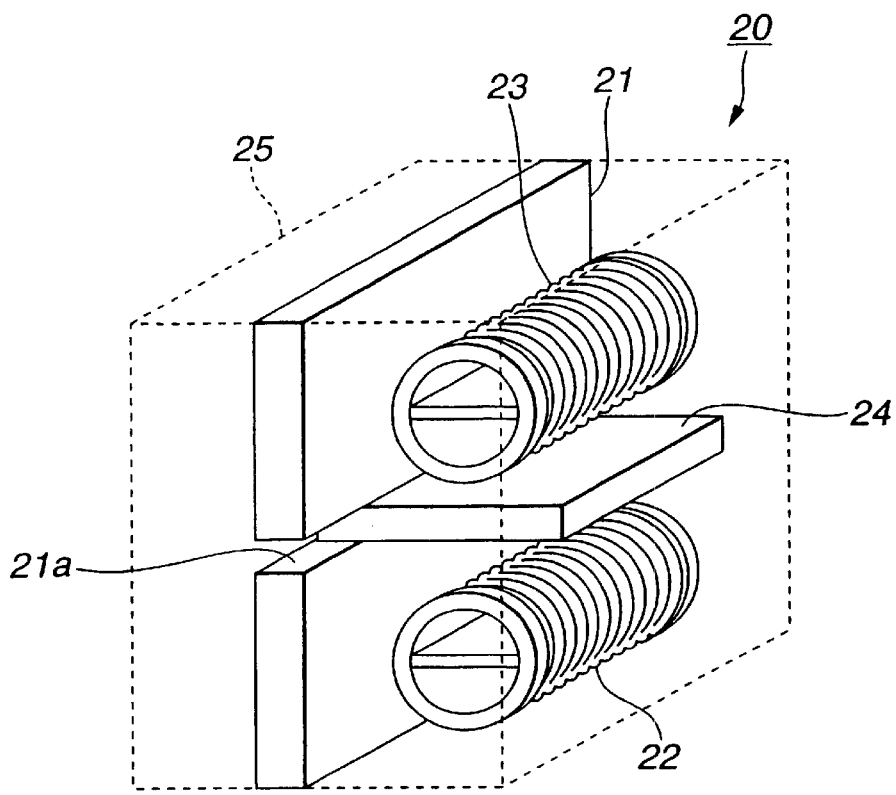
FIG. 7 is a perspective view of the magnetic sensor, schematically illustrating the construction thereof.

As shown in FIG. 7, the magnetic sensor 20 includes a substrate 21 formed like a rectangular plate and having a cut 21a formed therein and which splits the main sides thereof into two areas. On the main side of the substrate 21, there are installed first and second sensor units 22 and 23 in the two areas split by the cut 21a. Also, there is fitted in the cut 21a in the substrate 21 a magnetic shielding plate 24 made of a magnetic material such as Fe and having a thickness of about 1 mm. The magnetic shielding plate 24 is provided to allow the first and second sensor units 22 and 23 to detect a local external magnetic field such as a magnetic field from the scale 10 with a difference in magnetic sensitivity between them. In the magnetic sensor 20, one of the main sides of the substrate 21 on which the first and second sensor units 22 and 23 are installed and the other side of the substrate 21 to which a signal line (not shown) is connected, are covered with a protective material 25 formed from a resin or the like.

Figure 8:
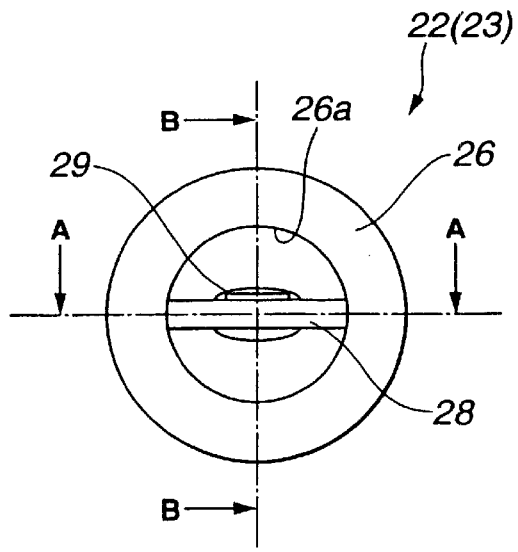
FIG. 8 is a plan view of the sensor units of the magnetic sensor from the end face thereof.
Figure 9:
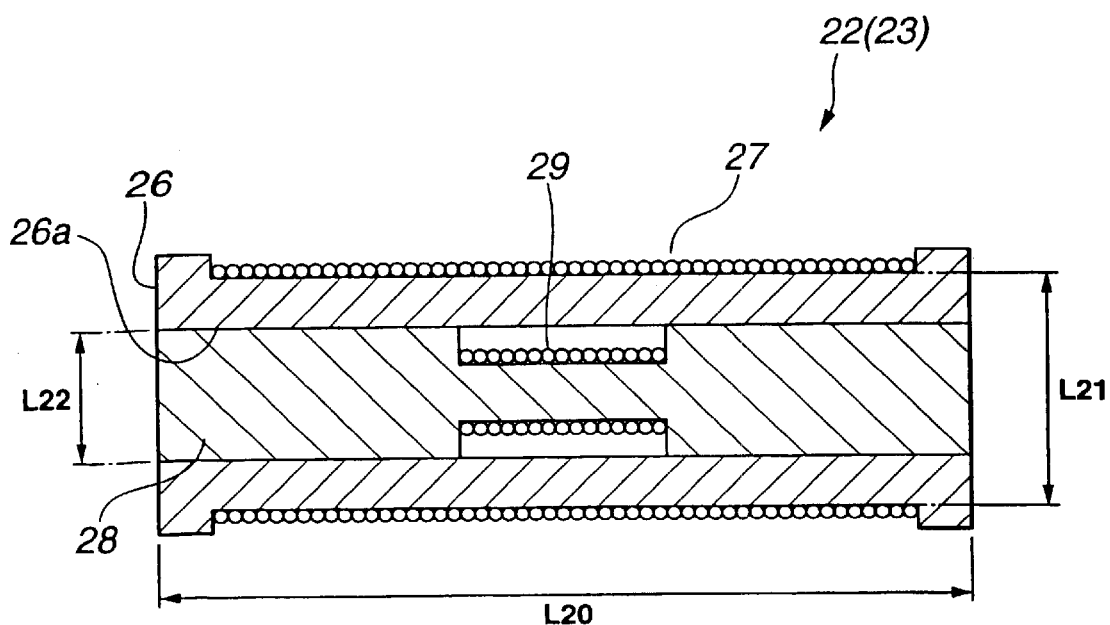
FIG. 9 is a sectional view taken along the line A—A in FIG. 8.
Figure 10:
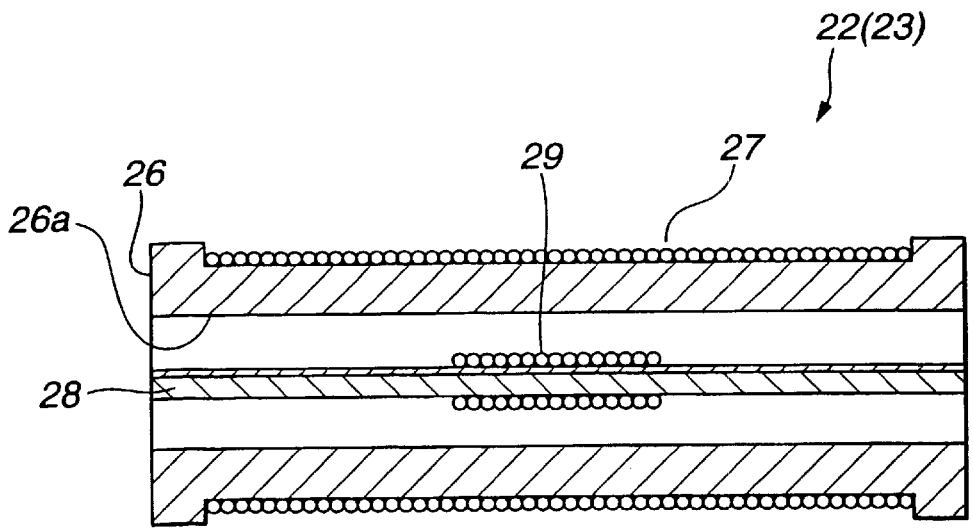
FIG. 10 is a sectional view taken along the line B—B in FIG. 8.

As shown in FIGS. 8 to 10, each of the first and second sensor units 22 and 23 includes a coil bobbin 26 formed cylindrical from a resin or the like, a bias coil 27 wound on the coil bobbin 26, a core unit 28 inserted n a center hole 26a in the coil bobbin 26, and a sensor coil 29 wound on the core unit 28. Note that FIG. 8 is a plan view of the first and second sensor units 22 and 23 from the end face of the coil bobbin 26, FIG. 9 is a sectional view taken along the line A—A in FIG. 8 and FIG. 10 is a sectional view taken along the line B—B in FIG. 8.

The coil bobbin 26 has a longitudinal length L20 of about 5 mm, and a diameter L21 of about 1.4 mm, for example, at the outer surface thereof on which the bias coil 27 is wound. Also, the center hole 26a in which the core unit 28 of the coil bobbin 26 is inserted has a diameter L22 of about 0.8 mm for example.

The bias coil 27 is provided to improve the output linearity of the first and second sensor units 22 and 23 with respect to an external magnetic field. It is formed from a Cu wire of 30 μm in diameter wound over a substantially whole outer surface of the coil bobbin 26. More particularly, the bias coil 27 is formed from 740 turns, for example, of the Cu wire wound on the outer surface of the coil bobbin 26, and the coil length is about 4 mm.

The bias coils 27 of the first and second sensor units 22 and 23, respectively, are connected in parallel to each other and built in a drive/detection circuit which will further be described later. Also, the bias coils 27 of the first and second sensor units 22 and 23 are driven with a DC current from the drive/detection circuit to develop bias magnetic fields which improve the output linearity of the first and second sensor circuits 22 and 23.

Figure 11:
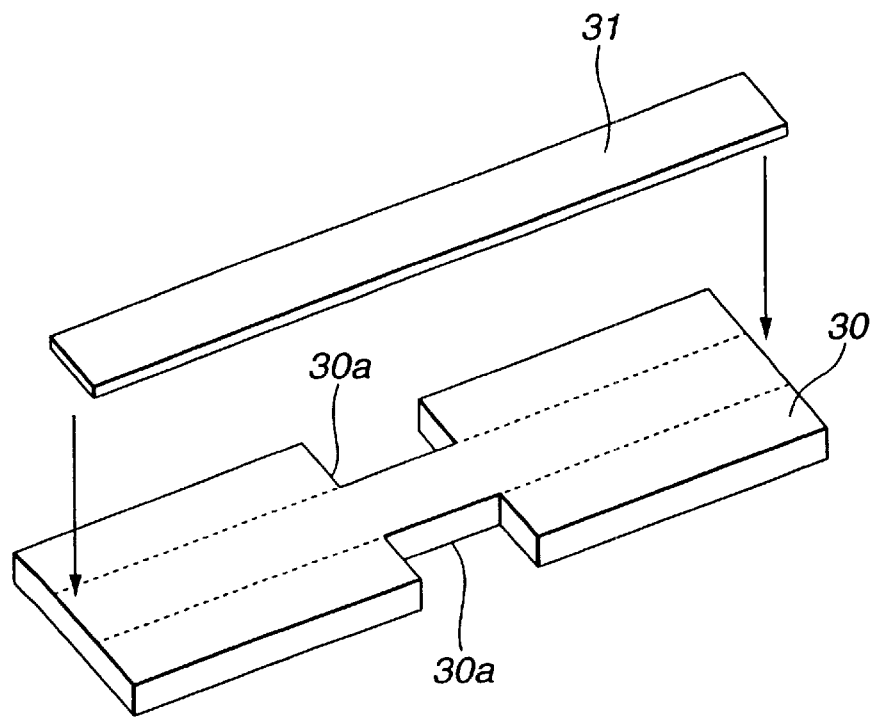
FIG. 11 is an exploded sectional view of a core provided in the sensor unit.

As shown in FIG. 11, the core unit 28 includes a core base 30 made of a nonmagnetic metal plate or the like and having cuts 30a formed nearly in the center thereof, and a core 31 made of a high permeability material such as Ni—Fe alloy. The core 31 is attached to the core base 30 to form the core unit 28. The sensor coil 29 is wound on the core base 30 and core 31 attached to the core base 30 and in the cuts 30a formed in the core base 30.

Figure 12:
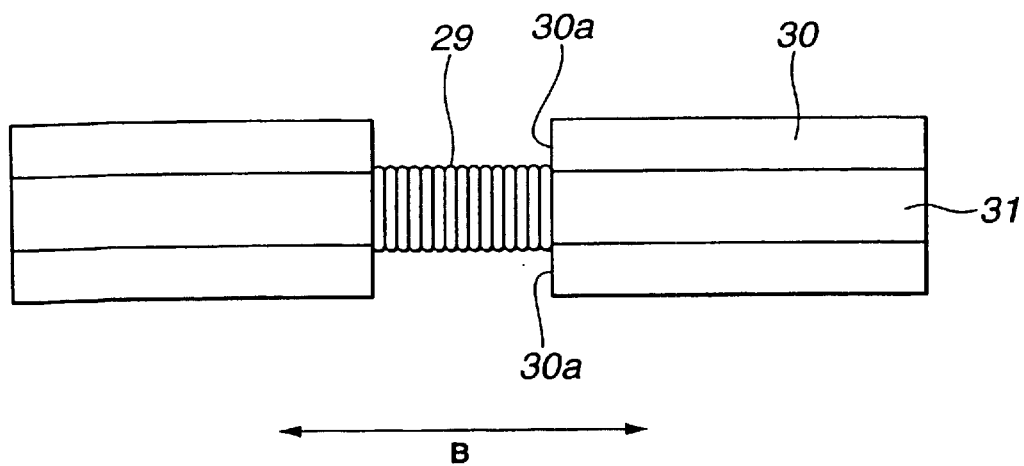
FIG. 12 is a plan view of the core on which a sensor coil is wound.

As shown in FIG. 12, the sensor coil 29 is formed from a Cu wire of about 30 μm in diameter for example wound to form a single layer on the core base 30 and core 31 and in the cuts 30a in the core base 30. More specifically, the sensor coil 29 is formed from 50 turns of the Cu wire coaxially with the bias coils 27 on the core base 30 and core 31 and in the cuts 30a. The length of the sensor coil 29 is about 1 mm.

The sensor coils 29 of the first sensor units 22 and 23 are connected in parallel to each other to form a bridge circuit and built in the drive/detection circuit which will further be described later. The sensor coils 29 of the first and second sensor units 22 and 23 are driven by the drive/detection circuit in phase with each other with a high frequency. Thereby, the first and second sensor units 22 and 23 will develop magnetic fields in the same directions as indicated with an arrow B in FIG. 12.

The magnetic sensor 20 constructed as in the above can detect, with a high sensitivity, an external magnetic field incident upon the first and second sensor units 22 and 23 along the longitudinal direction of them, namely, an external magnetic field parallel to the direction of a magnetic field developed by the sensor coil 29. The magnetic sensor 20 is disposed over the scale 10 movably in relation to the latter in such a manner that the direction in which it can detect the external magnetic field with the high sensitivity (magnetic detection direction) will coincide with the width direction of the scale 10, indicated with the arrow Y in FIG. 4, and the first and second sensor units 22 and 23 will take different positions in the Z-direction indicated with the arrow Z in FIG. 4, perpendicular to the X-direction being the longitudinal direction (relatively moving direction of the magnetic sensor 20) of the scale 10 as well as to the Y-direction being the width direction of the scale 10.

In the above position transducer 1, as the moving part of the machine tool, industrial robot or the like moves linearly, the magnetic sensor 20 will be moved linearly over the scale 10 along the center line A of the latter. With this linear movement of the magnetic sensor 20 over the scale 10 along the center line A, the strength and direction of a magnetic field incident upon the magnetic sensor 20 from the scale 10 will be changed linearly. Thus, the impedance of the sensor coil 29 driven with a high frequency by the drive/detection circuit will be changed linearly correspondingly to a moved position of the magnetic sensor 20 relative to the scale 10. In the position transducer 1, the change of the impedance of the sensor coil 29, thus changed correspondingly to the moved position of the magnetic sensor 20 relative to the scale 10, is converted to a voltage change and this voltage change is detected, to thereby detect an amount of travel of the magnetic sensor 20 relative to the scale 10, that is, an amount of travel and moved position of the moving part of the machine tool, industrial robot or the like, to which the magnetic sensor 20 or the scale 10 is fixed.

Also in the position transducer 1, since the sensor units 22 and 23 of the magnetic sensor 20 are disposed in different positions in the Z-direction as shown in FIG. 4, there will take place a difference between the magnetic fields incident upon the first and second sensor units 22 and 23, respectively, from the scale 10. Especially in case the magnetic shielding plate 24 is disposed between the first and second sensor units 22 and 23, the magnetic field from the scale 10 will be blocked by the magnetic shielding plate 24, so that the magnetic field from the scale 10 will be incident only upon the first sensor unit 22 and it will little be incident upon the second sensor unit 23. That is, the difference between the incident magnetic fields incident upon the first and second sensor units 22 and 23, respectively, will be very large.

In the position transducer 1, since there occurs a difference between the incident magnetic fields upon the first and second sensor units 22 and 23 from the scale 10 as in the above, a difference in output between the first and second sensor units is determined to detect an amount of travel and moved position of the magnetic sensor 20 relative to the scale 10, that is, an amount of travel and moved position of the moving part of the machine tool, industrial robot or the like. Thus, the position transducer 1 can detect, with a high accuracy, the amount of travel and moved position of the moving part while canceling an output change due to electric noises and temperature change affecting the magnetic sensor 20.

Further in the position transducer 1, since the first and second sensor units 22 and 23 are driven in phase with each other, determination of the output difference permits to cancel an influence of an external magnetic field such as geomagnetism incident in phase and uniformly upon the first and second sensor units 22 and 23, which will make it possible to detect, with a higher accuracy, the amount of travel and moved position of the moving part.

The drive/detection circuit provided in the position transducer 1 will be described hereunder. The drive/detection circuit provided in the position transducer 1 is generally indicated with a reference 40 in FIG. 13. As shown, it includes an oscillation circuit 41, a switching circuit 42 which switches a driving current to the sensor coil 29 (will be referred to as "first sensor coil 29a" hereunder) of the first sensor unit 22 and sensor coil 29 (will be referred to as "second sensor coil 29b" hereunder) of the second sensor unit 23 on the basis of a pulse signal from the oscillation circuit 41, a first smoothing circuit 43 which detects and smoothes an output voltage of the first sensor coil 29a, a second smoothing circuit 44 which detects and smoothes an output voltage of the second sensor coil 29b, a differential amplification circuit 45 which detects a difference between output voltages from the first and second smoothing circuits 43 and 44 and provides a differential signal, and a bias circuit 46 which drives and controls the bias coil 27 (will be referred to as "first bias coil 27a" hereunder) of the first sensor unit 22 and bias coil 27 (will be referred to as "second bias coil 27b" hereunder) of the second sensor unit 23.

Figure 13:
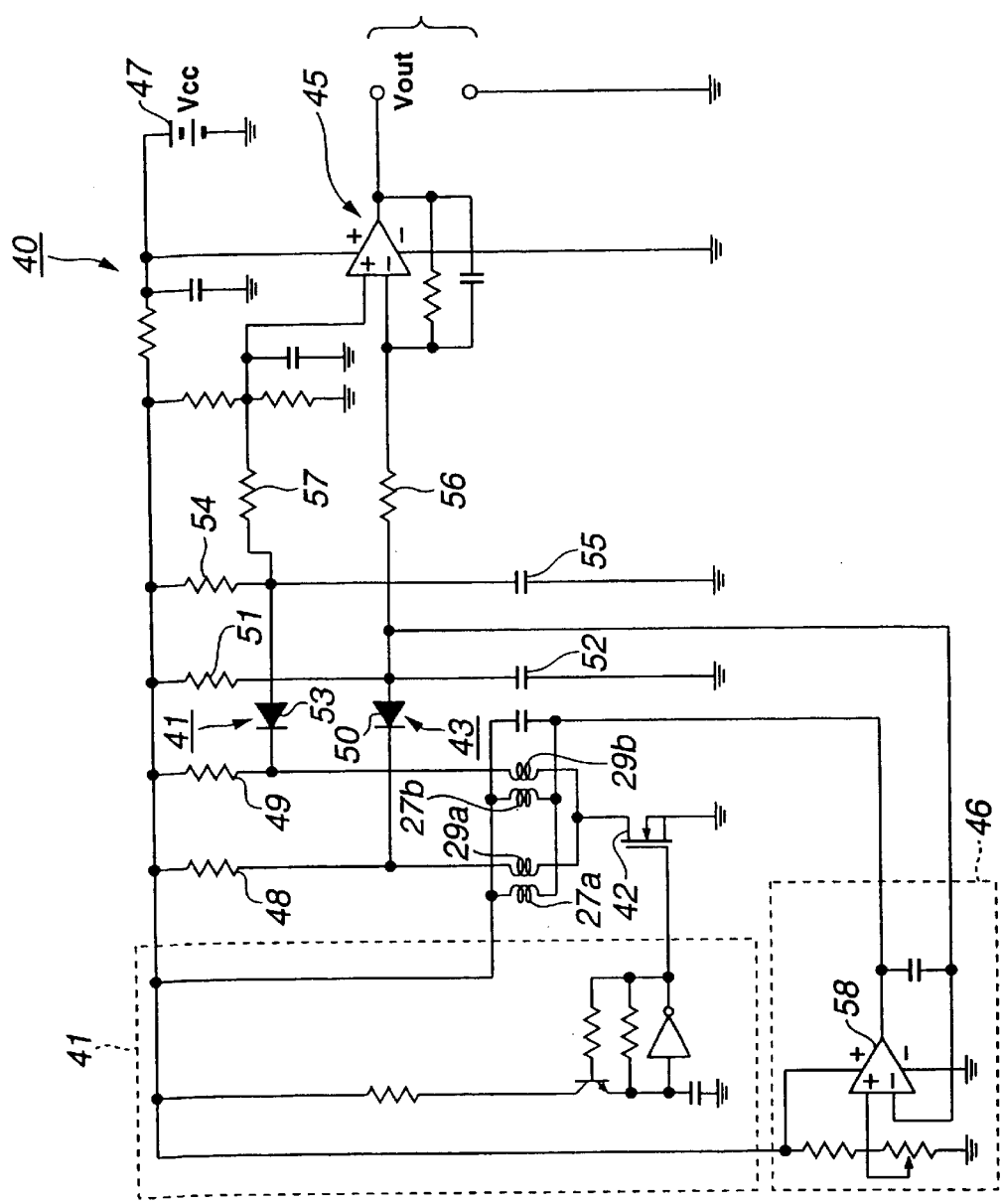
FIG. 13 is a circuit diagram of a drive/detection circuit provided in the position transducer according to the present invention.

The above oscillation circuit 41 generates a high frequency pulse signal whose frequency is 1 MHz and pulse width is 100 ns. Since the oscillation circuit 41 shown in FIG. 13 is of a multivibrator type, it includes a smaller number of parts and thus can be produced inexpensively. Also, the oscillation circuit 41 makes an RC oscillation, so it will not influence the characteristics of the sensor coils 29a and 29b. Note that the oscillation circuit 41 may be a one using a Colpitts oscillator or crystal oscillator.

The switching circuit 42 switches a driving current through the first and second sensor coils 29a and 29b correspondingly to the high frequency pulse signal from the oscillation circuit 41.

Note that the sensor coils 29a and 29b may be driven with a sinusoidal wave. However, the pulse signal is advantageous in that it contains a high frequency component and so can drive the sensor coils 29a and 29b efficiently, its duty ratio can be adjusted and so contribute to a reduced power consumption, and that it contains a DC component and so the point of impedance change with respect to an external magnetic field can freely be changed. Therefore, the sensor coils 29a and 29b should desirably be driven with a pulsed wave.

As aforementioned, the first and second sensor coils 29a and 29b are connected in parallel to each other to form a bridge circuit, and built in the drive/detection circuit 40. More specifically, the first sensor coil 29a is connected at one end thereof to a power source 47 via a bridge resistor 48 and at the other end to the switching circuit 42. The second sensor coil 29b is connected at one end thereof to the power source 47 via a bridge resistor 49 and at the other end to the switching circuit 42. The sensor coils 29a and 29b thus connected in parallel to each other and built in the drive/detection circuit 40 are switched by the switching circuit 42 and thus driven in phase with each other and excited in phase with each other with a high frequency.

The first smoothing circuit 43 includes a diode 50 having a cathode thereof connected to a junction of the first sensor coil 29a and bridge resistor 48, a resistor 51 connected at one end thereof to the power source 47 and at the other end to an anode of the diode 50, and a capacitor 52 connected at one end thereof to the ground potential and at the other hand to the anode of the diode 50. The first smoothing circuit 43 is provided to smooth a voltage produced at the first sensor coil 29a excited with a high frequency.

Similarly, the second smoothing circuit 44 includes a diode 53 having a cathode thereof connected to a junction of the second sensor coil 29b and bridge resistor 49, a resistor 54 connected at one end thereof to the power source 47 and at the other end to an anode of the diode 53, and a capacitor 55 connected at one end thereof to the ground potential and at the other hand to the anode of the diode 53. The first smoothing circuit 44 is provided to smooth a voltage produced at the second sensor coil 29b excited with a high frequency.

The above differential amplification circuit 45 is connected at a negative input terminal thereof to the anode of the diode 50 in the first smoothing circuit 43 via a resistor 56 and at a positive input terminal to the anode of the diode 53 in the second smoothing circuit 44 via a resistor 57. The differential amplification circuit 45 is provided to amplify a difference between a voltage produced by the first sensor coil 29a and smoothed by the first smoothing circuit 43 and a voltage produced by the second sensor coil 29b and smoothed by the second smoothing circuit 44.

The bias circuit 46 is provided to drive and control the first and second bias coils 27a and 27b to improve the impedance change of the first and second sensor coils 29a and 29b due to a magnetic field, and apply an appropriate bias magnetic field to the first and second sensor units 22 and 23.

The bias circuit 46 includes an operational amplifier 58 which is supplied at a negative input terminal thereof with a voltage produced by the second sensor coil 29b and smoothed by the second smoothing circuit 44, and at a positive input terminal with a desired voltage. The operational amplifier 58 has connected to the output terminal thereof the first and second bias coils 27a and 27b.

The bias circuit 46 thus constructed can drive and control the first and second bias coils 27a and 27b connected to the output terminal of the operational amplifier 58 according to a desired voltage supplied to the positive input terminal of the operational amplifier 58, and thus always equalize the voltage produced in the second sensor coil 29b and smoothed by the second smoothing circuit 44 to the desired voltage supplied to the positive input terminal of the operational amplifier 58. Thus, even when a change of the ambient temperature around the magnetic sensor 20 has caused a change in impedance of the first and second sensor coils 29a and 29b, an optimum bias magnetic field can always be applied to the first and second sensor units 22 and 23, whereby the output linearity can be improved.

Since the first and second sensor coils 29a and 29b are driven with a high frequency pulse signal, a DC component is already applied to the sensor coils 29a and 29b. Therefore, the optimum amount of magnetic bias for a best change in impedance of the first and second sensor coils 29a and 29b due to an external magnetic field will be different from the application of a bias magnetic field in the same direction as the excited and driven direction of the sensor coils 29a and 29b to the application of a bias magnetic field in an opposite direction to the excited and driven direction of the sensor coils 29a and 29b. Thus, in case a bias magnetic field is applied in an opposite direction to the excited and driven direction of the sensor coils 29a and 29b, it has to be larger or stronger than a bias magnetic field applied in the same direction as the excited and driven direction of the sensor coils 29a and 29b.

In case a bias magnetic field is applied in an opposite direction to the excited and driven direction of the sensor coils 29a and 29b, a relatively strong magnetic field has to be applied as in the above. In this case, however, the sensitivity of the magnetic sensor 20 to an external magnetic field may be relatively low with an impedance change being nearly the same as a one which would be when a bias magnetic field is applied in the same direction as the excited and driven direction of the sensor coils 29a and 29b. Therefore, in case the magnetic sensor 20 is required to work stably with an external magnetic field, a bis magnetic field should desirably be applied in an opposite direction to the excited and driven direction of the sensor coils 29a and 29b. On the other hand, when the magnetic sensor 20 is required to have an improved sensitivity rather that such a stable operation with an external magnetic field, a bias magnetic field should be applied in the same direction as the excited and driven direction of the sensor coil 29a and 29b.

In the drive/detection circuit 40 constructed as in the above, when the switching circuit 42 is switched with a high frequency pulse signal from the oscillation circuit 41, the first and second sensor coils 29a and 29b are driven in phase with each other and excited in phase with each other with a high frequency. At this time, the impedances of the first and second sensor coils 29a and 29b will be determined by the strength of an external magnetic field incident upon the sensor coils 29a and 29b in a direction parallel to the excited direction of the sensor coils 29a and 29b.

Since the first and second sensor units 22 and 23 are disposed in positions where they will detect a magnetic field from the scale 10 with different sensitivities, respectively, as in the above, there will take place a difference between the impedances of the sensor coils 29a and 29b. The difference in impedance between the sensor coils 29a and 29b will change correspondingly to a relative position of the magnetic sensor 20 to the scale 10.

In the drive/detection circuit 40, a voltage corresponding to the impedance of the first sensor coil 29a is smoothed by the first smoothing circuit 43 and supplied to the differential amplification circuit 45, while a voltage corresponding to the impedance of the second sensor coil 29b of the second sensor unit 23 is smoothed by the second smoothing circuit 44 and supplied to the differential amplification circuit 45. The differential amplification circuit 45 will determine a difference between the output voltages (differential output) from the first and second sensor coils 29a and 29b to detect an amount of travel and moved position of the magnetic sensor 20 relative to the scale 10.

It should be noted that the drive/detection circuit 40 provided in the position transducer 1 according to the present invention is not limited to the example shown in FIG. 13 but may be any one which is adapted to drive the first and second sensor coils 29a and 29b and detect as a differential output a voltage change corresponding to a change in impedance of the first and second sensor coils 29a and 29b, and drive and control the bias coils 27a and 27b appropriately to apply an optimum bias magnetic field to the first and second sensor units 22 and 23.

Figure 14:
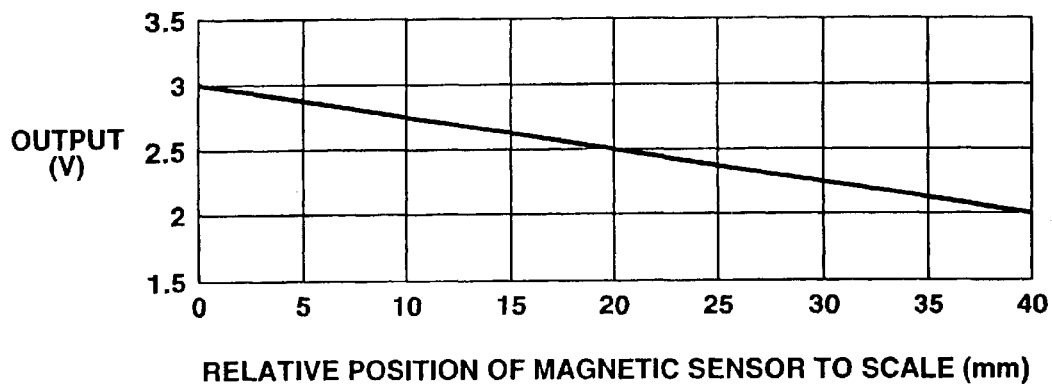
FIG. 14 shows the output characteristic of the position transducer according to the present invention.

FIG. 14 shows the output characteristic of the position transducer 1 constructed as in the above. As seen, in the position transducer 1, when the magnetic sensor 20 moves relative to the scale 10 in a range of the effective length for detection of 40 mm, it provides an output which changes linearly in a range of 2 to 3 V. Therefore, by fixing one of the scale 10 and magnetic sensor 20 of the position transducer 1 to a moving part of a machine tool, industrial robot or the like while the other to a stationary part of the machine tool etc. so that as the moving part moves, the magnetic sensor 20 is moved relatively to the scale 10, it is possible to detect, with a high accuracy, an amount of travel and moved position of the moving part of the machine tool in a range of 40 mm.

Also in the position transducer 1, since changes in impedance of the sensor coils 29a and 29b due to the relative movement of the magnetic sensor 20 to the scale 10 are converted to voltage changes and a difference between the output voltages is determined to detect a moved position of the magnetic sensor 20 relative to the scale 10 as having been described in the foregoing, an amount of travel and moved position of the magnetic sensor 20 relative to the scale 10, namely, an amount of travel and moved position of the moving part of the machine tool, fixed to the magnetic sensor 20 or scale 10, can be detected with a very high accuracy while canceling the output characteristic change of the sensor coils 29a and 29b due to electric noises and change of the ambient temperature around the sensor coils 29a and 29b.

Also in the position transducer 1 according to the present invention, since a moved position of the magnetic sensor 20 relative to the scale 10 is detected by determining a difference in output between the first and second sensor units 22 and 23 driven in phase with each other as having been described above, an amount of travel and moved position of the moving part of the machine tool can be detected with a high accuracy while canceling influence of a disturbing magnetic field such as geomagnetism incident in phase and uniformly upon the first and second sensor units 22 and 23.

Figure 15:
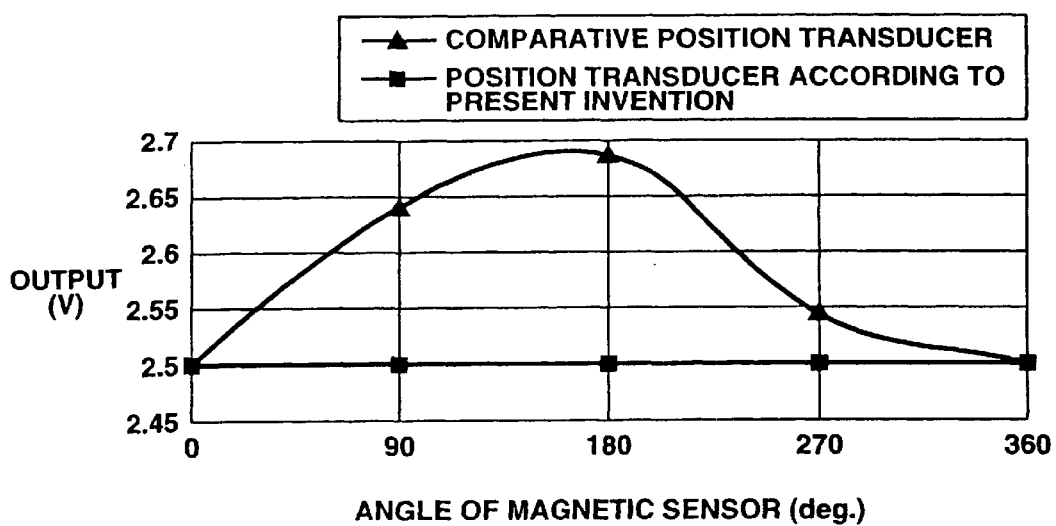
FIG. 15 shows relations between output of the position transducer according to the present invention and geomagnetism, and between output of a comparative position transducer and geomagnetism.

FIG. 15 shows a relation between output of the position transducer 1 according to the present invention and a disturbing magnetic field such as geomagnetism, and also a relation between output of a comparative position transducer in which a relative position of a magnetic sensor to a scale is detected by determining a different between outputs of two magnetic sensors driven in opposite phases, respectively, to each other and a disturbing magnetic field such as geomagnetism. The relations between the outputs of these position transducers and the disturbing magnetic field such as geomagnetism were determined by detecting an output of the position transducer turned about a Z-axis (direction indicated with arrow Z in FIG. 4) with the magnetic sensor taken as a center.

As seen from FIG. 15, the output changes when the comparative position transducer is turned about the X-axis with the magnetic sensor taken as a center. Since the relative position of the magnetic sensor to the scale is not changed when the position transducer is so turned, the output is changed due to a disturbing magnetic field such as geomagnetism. Thus, if the output is changed due to the disturbing magnetic field such as geomagnetism, an amount of travel and moved position of the magnetic sensor relative to the scale cannot be detected accurately.

On the other hand, in the position transducer 1 according to the present invention, even if it is turned about the Z-axis with the magnetic sensor 20 taken as a center, no output change will take place for the following reason. That is to say, in the position transducer 1 according to the present invention, since a moved position of the magnetic sensor 20 relative to the scale 10 is detected by determining a difference between outputs of the first and second sensor units 22 and 23, it is possible to cancel the influence of a disturbing magnetic field such as geomagnetism, incident in phase and uniformly upon the first and second senor units 22 and 23. Note that FIG. 15 shows the relation between output of the position transducer 1 and disturbing magnetic field when the position transducer 1 is turned about the Z-axis but it has been found that the output will little change even when the position transducer 1 is turned about the X-axis (direction indicated with arrow X in FIG. 4) and also about the Y-axis (direction indicated with arrow Y in FIG. 4).

Since with the position transducer 1 according to the present invention, it is possible to effectively cancel the influence of disturbing magnetic field such as geomagnetism, an amount of travel and moved position of the magnetic sensor 20 relative to the scale 10, that is, an amount of travel and moved position of the moving part fixed to the magnetic sensor 20 or scale 10 can be detected with an extremely high accuracy.

Also, in the position transducer 1 according to the present invention, the first sensor unit 22 with the first bias coil 27a and second sensor unit 23 with the second bias coil 27b are driven in phase with each other so as to be sensitive to an external magnetic field having the same direction as the first and second sensor units 22 and 23 and the bias coils 27a and 27b are driven by the bias circuit 46 so that the output of the second sensor unit 23, taken as a reference output, will be constant. So, even when the impedances of the first and second sensor coils 29a and 29b are changed due to a change of the ambient temperature around the magnetic sensor 20, an optical bias magnetic field can always be applied to the first and second sensor units 22 and 23 to improve the output linearity, whereby an amount of travel and moved position of the magnetic sensor 20 relative to the scale 10, namely, an amount of travel and moved position of the moving part fixed to the magnetic sensor 20 or scale 10, can be detected with a higher accuracy.

Figure 16:
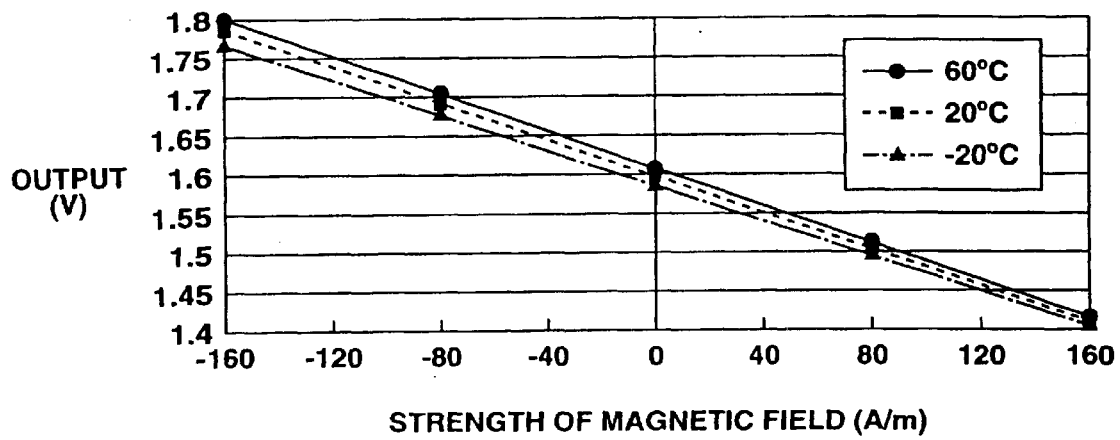
FIG. 16 shows changes in output of the position transducer according to the present invention when the ambient temperature around the magnetic sensor changes.
Figure 17:
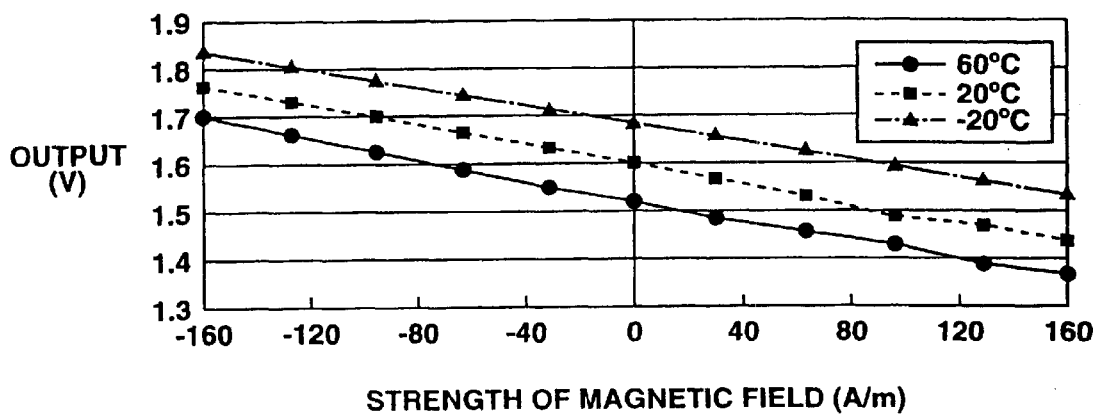
FIG. 17 shows changes in output of the comparative position transducer when the ambient temperature around the magnetic sensor changed.

FIG. 16 shows changes in output of the position transducer 1 constructed as in the above according to the present invention when the ambient temperature around the magnetic sensor 20 changes, and FIG. 17 shows changes in output of the comparative position transducer, constructed such that first and second sensor units are always applied with a constant bias magnetic field, when the ambient temperature around the magnetic sensor changes.

As seen from FIG. 17, in the comparative position transducer, when the ambient temperature around the magnetic sensor changes, the output changes very much for the following reason. Namely, in the comparative position transducer, since a constant bias magnetic field is always applied to the first and second sensor units irrespectively of the ambient temperature around the magnetic sensor, no optimum bias magnetic field can be applied to the first and second sensor units if the impedances of the sensor coils are changed due to a change of the ambient temperature around the magnetic sensor and thus the optimum bias point is shifted. Thus, a change of the magnetic sensor output due to a change of the ambient temperature around the magnetic sensor will make it impossible to appropriately detect an amount of travel and moved position of the magnetic sensor relative to the scale.

On the other hand, with the position transducer 1 according to the present invention, it is possible to considerably suppress the variation of the magnetic sensor output even when the ambient temperature around the magnetic sensor 20 changes, as shown in FIG. 16. This is because in the position transducer 1 according to the present invention, the output of one of the first and second sensor units 22 and 23 driven in phase with each other, that is, the output of the second sensor unit 23 in this case, is taken as a reference output and the bias coils 27a and 27b are driven and controlled by the bias circuit 46 for the reference output to be a constant voltage, and thus an optimum bias magnetic field can always be applied to the first and second sensor units 22 and 23 even when the impedances of the first and second sensor coils 29a and 29b are changed due to a change of the ambient temperature around the magnetic sensor 20.

As having been described in the foregoing, in the position transducer 1 according to the present invention, since the output change due to a change of the ambient temperature around the magnetic sensor 20 can be suppressed considerably, it is possible to detect, with a higher accuracy, an amount of travel and moved position of the magnetic sensor 20 relative to the scale 10, namely, an amount of travel and moved position of the moving part of the machine tool or the like, fixed to the magnetic sensor 20 or scale 10.

Note that the aforementioned position transducer 1 has been described as an example intended to illustrate and describe the construction of the position transducer according to the present invention and may be subjected to various modifications without departing from the scope and spirit of the present invention.

Figure 18:
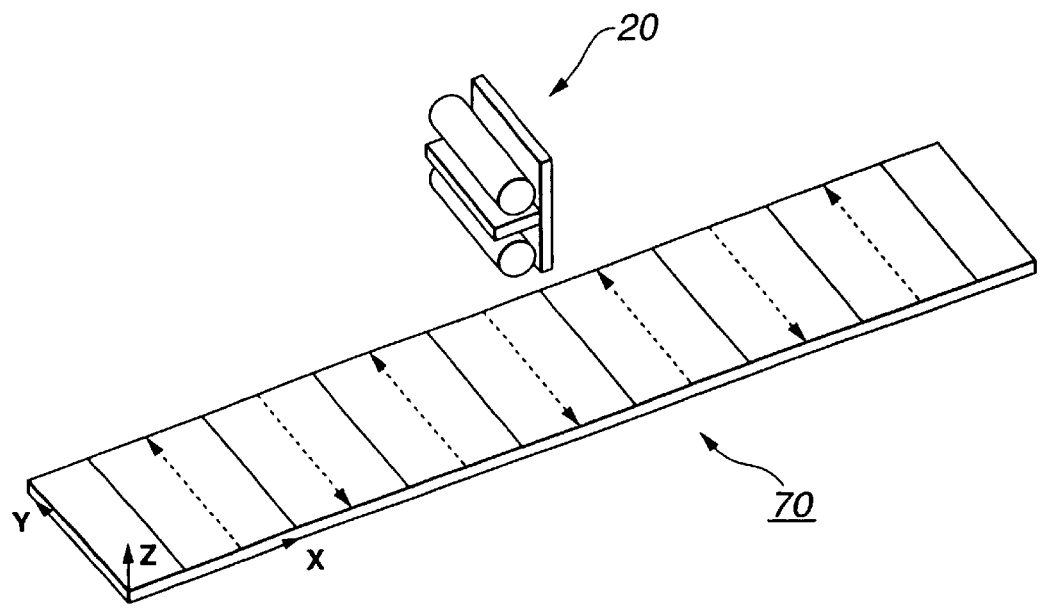
FIG. 18 is a perspective view of another embodiment of the position transducer according to the present invention.

In the aforementioned position transducer 1, the magnetic field developing means for developing a magnetic field whose strength and direction are variable correspondingly to a position of the magnetic field developing means is the scale 10 being a combination of the first to fourth magnetic field developing members 11, 12, 13 and 14 polarized in a direction perpendicular to the main sides of the scale thereof. According to another aspect of the present invention, however, the scale 10 may be replaced with a scale 70, as a magnetic field developing means, which is polarized in a Y-direction perpendicular to the relatively moving direction of the magnetic sensor 20 (X-direction) and parallel to the main sides thereof and develops magnetic fields opposite in direction to each other at regular directions along the X-direction, as shown in FIG. 18 for example.

Figure 19:
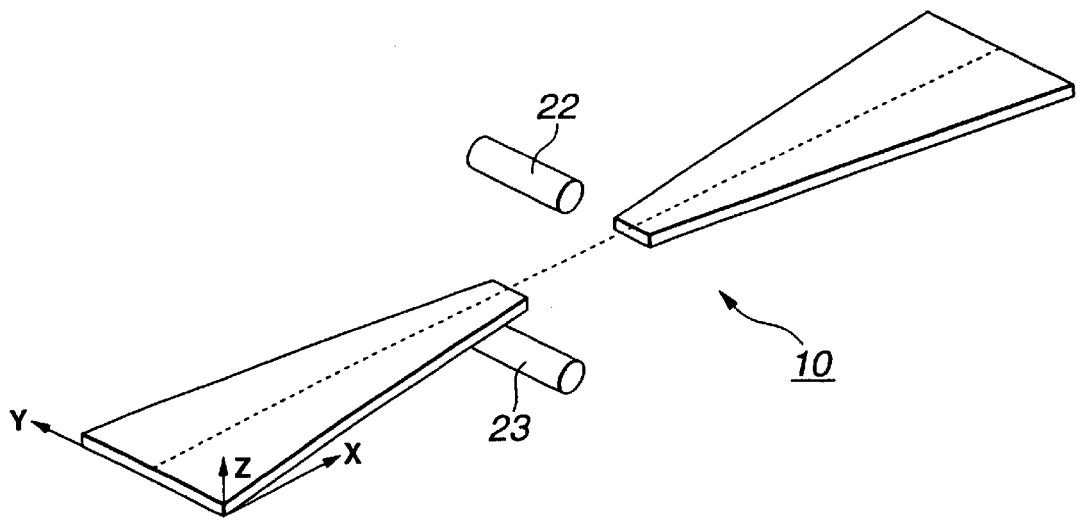
FIG. 19 is a perspective view of a still another embodiment of the position transducer according to the present invention.

Also in the aforementioned position transducer 1, the first and second sensor units 22 and 23 of the magnetic sensor 20 are disposed on one of the main sides of the scale 10. The first sensor unit 22 is disposed near the scale 10 while the second sensor unit 23 is disposed at a position separate from the scale 10, so that there will take place a difference between a magnetic field incident upon the first sensor unit 22 from the scale 10 and a one incident upon the second sensor unit 23 from the scale 10. According to a yet another aspect of the present invention, however, the first sensor unit 22 may be disposed on one of the main sides of the scale 10 while the second sensor unit 23 is disposed on the other main side, as shown in FIG. 19, so that there will take place a difference between a magnetic field incident upon the first sensor unit 22 from the scale 10 and a one incident upon the second sensor unit 23 from the scale 10.

In this case, the direction of the magnetic field incident upon the first sensor unit 22 from the scale 10 is opposite to that of the magnetic field incident upon the second sensor unit 23 from the scale 10. So, by determining a difference between outputs of the first and second sensor units 22 and 23, it is possible to provide a larger output than in the aforementioned two other embodiments while canceling the influence of a disturbing magnetic field such as geomagnetism incident in phase and uniformly upon the first and second sensor units 22 and 23.

What is claimed is:

1. A position transducer comprising:
    magnetic field developing means for developing a magnetic field whose strength and direction change in response to a position of the magnetic field developing means;
    magnetic field detecting means moved relatively to the magnetic field developing means for detecting a magnetic field developed by the magnetic field developing means and for providing an electrical signal corresponding to the detected magnetic field; and
    relative position detecting means for detecting a relative position of the magnetic field detecting means relative to the magnetic field developing means in response to the electrical signal provided from the magnetic field detecting means, wherein the magnetic field detecting means consists of two sensor units each formed from a sensor coil wound on a high permeability core and driven in phase with each other with a high frequency, the two sensor units being disposed in different positions in a direction perpendicular to a moving direction of the magnetic field detecting means relative to the magnetic field developing means, and the relative position detecting means detects the relative position of the magnetic field detecting means relative to the magnetic field developing means by determining a difference between outputs of the two sensor units.

2. The position transducer as set forth in claim 1, wherein a magnetic shielding member is provided between the two sensor units of the magnetic field detecting means.

* * * * *